United States Patent
Ono et al.

(10) Patent No.: US 7,336,885 B2
(45) Date of Patent: Feb. 26, 2008

(54) TEST APPARATUS, OPTICAL COUPLER AND METHOD OF MANUFACTURING SAME

(75) Inventors: Atsushi Ono, Tokyo (JP); Toshiyuki Okayasu, Tokyo (JP); Akihiro Fujimoto, Tokyo (JP); Masashi Shibata, Tokyo (JP)

(73) Assignee: Advantest Corporation, Tokyo (JP)

( * ) Notice: Subject to any disclaimer, the term of this patent is extended or adjusted under 35 U.S.C. 154(b) by 45 days.

(21) Appl. No.: 11/217,125

(22) Filed: Aug. 31, 2005

(65) Prior Publication Data

US 2006/0115223 A1    Jun. 1, 2006

(30) Foreign Application Priority Data

Nov. 30, 2004    (JP) ............................ 2004-347676

(51) Int. Cl.
*G02B 6/00*    (2006.01)

(52) U.S. Cl. ...................... 385/135; 385/115; 385/136; 385/137; 385/104; 385/105

(58) Field of Classification Search ................. 385/115
See application file for complete search history.

(56) References Cited

U.S. PATENT DOCUMENTS 4,898,448 A * 2/1990 Cooper ........................ 385/92
4,900,123 A * 2/1990 Barlow et al. ................. 385/53
6,157,200 A * 12/2000 Okayasu ...................... 324/753
6,983,095 B2 * 1/2006 Reagan et al. ............... 385/135
2003/0219194 A1 * 11/2003 Barthel et al. ................. 385/15

* cited by examiner

*Primary Examiner*—Sung Pak
*Assistant Examiner*—Chad H. Smith
(74) *Attorney, Agent, or Firm*—Osha Liang LLP (57) ABSTRACT

A test apparatus including an optical coupler for optically coupling a main frame and a test head is provided. The optical coupler has a plurality of optical fiber cables, a cable storage chain for bundling a stored portion except for a non-stored portion in a part of the test head side and a non-stored portion in a part of the main frame side of the plurality of optical fiber cables and storing the same, a test head side cable storage unit provided at the boundary between the non-stored portion and the stored portion of the plurality of optical fiber cables on the test head side and being capable of adjusting a length for storing therein the non-stored portion on the test head side and a main frame side cable storage unit provided at the boundary between the non-stored portion and the stored portion of the plurality of optical fiber cables on the main frame side and being capable of adjusting a length for storing therein the non-stored portion on the main frame side.

15 Claims, 5 Drawing Sheets

TEST APPARATUS, OPTICAL COUPLER AND METHOD OF MANUFACTURING SAME

CROSS REFERENCE TO RELATED APPLICATION

The present application claims priority benefit from a Japanese Patent Application No. 2004-347676 filed on Nov. 30, 2004, the contents of which are incorporated herein by reference.

BACKGROUND OF THE INVENTION

1. Field of the Invention

The present invention relates to a test apparatus, an optical coupler of the test apparatus and a method of manufacturing the same. Particularly, the present invention relates to a test apparatus for optically coupling a main frame and a test head of the test apparatus, an optical coupler of the test apparatus and a method of manufacturing the same.

2. Related Art

Recently, a test apparatus for testing an electronic device is expected to operate at high speed along with speeding up of the electronic device. Thus, means for coupling a test head which applies a test pattern to a device under test and a main frame which controls test sequences of the test head through optical fiber cables has been suggested. Here, since any prior art document is not recognized at present, it is not omitted to describe.

When optical fiber cables are used as a signal transmission route, it is necessary to satisfy the curvature limit of the optical fiber cables and particularly, that is an important matter to couple the optical fiber cables to a movable equipment such as a test head. Additionally, it is a problem to be solved that the curvature limit of a number of optical fiber cables provided in a narrow space such as a test head is satisfied.

Further, it is necessary to provide a number of optical fiber cables between the main frame and the test head, and the positions of connectors on the main frame and the test head are different for each optical fiber cable. Therefore, it is expected that the optical fiber cables are appropriately bundled to wire the same.

SUMMARY OF THE INVENTION

The object of the present invention is to provide a test apparatus, an optical coupler and a method of manufacturing the same being capable of the above-described problems. This object is achieved by combining the features recited in independent claims. Then, dependent claims define further effective specific example of the present invention.

According to a first embodiment of the present invention, a test apparatus for testing a device under test is provided. The test apparatus includes a test head for applying a test pattern to the device under test, a main frame for controlling test sequences of the test head and an optical coupler for optically coupling the main frame and the test head. The optical coupler has: a plurality of optical fiber cables for optically coupling the main frame and the test head; a cable storage chain for bundling stored portions except for a non-stored portion of the plurality of optical fiber cables on the test head side and a non-stored portion of the plurality of optical fiber cables on the main frame side to store therein the same; a test head side cable storage unit provided at the boundary between the non-stored portion and the stored portion of the plurality of optical fiber cables on the test head side and being capable of adjusting a length for storing therein the non-stored portion of the plurality of optical fiber cables on the test head side; and a main frame side cable storage unit provided at the boundary between the non-stored portion and the stored portion of the plurality of optical fiber cables on the main frame side and being capable of adjusting a length for storing therein the non-stored portion of the plurality of optical fiber cables on the main frame side.

The device under test may be placed on the upper surface of the test head. The test head side cable storage unit may be attached to the bottom surface of the test head.

The test head side cable storage unit may include a storage chain side fixing part for fixing the end of the test head side of the cable storage chain.

The test head side cable storage unit may include a test head side fixing part for fixing the non-stored portion of the plurality of optical fiber cables on the test head side at the boundary between a portion stored into the test head side cable storage unit and a portion extending to the outside of the test head side cable storage unit.

The cable storage chain may store the plurality of optical fiber cables by bundling a plurality of combination cables, one of which bundles two or more optical fiber cables. The test head side cable storage unit may include a storage chain side fixing part for fixing the end of the cable storage chain on the test head side, a combination cable fixing part for fixing the combination cable extending from the cable storage chain at the end from which the combination cable is divided into two or more optical fiber cables and a test head side fixing part for fixing the non-stored portion of the plurality of optical fiber cables on the test head side at the boundary between a portion stored into the test head side cable storage unit and a portion extending to the outside of the test head side cable storage unit.

The test head side cable storage unit may include an inner-storage unit fixing part for bending a portion stored into the test head side cable storage unit of the non-stored portion of the optical fiber cables on the test head side such that the bending radius of the portion stored into the test head side cable storage unit is larger than the allowance bending radius of the optical fiber cables and fixing the same.

The main frame side cable storage unit may include a storage chain side fixing part for fixing the end of the cable storage chain on the main frame side.

The main frame side cable storage unit may include a main frame side fixing part for fixing the non-stored portion of the plurality of optical fiber cables on the main frame side at the boundary between a portion stored into the main frame side cable storage unit and a portion extending to the outside of the main frame side cable storage unit.

The cable storage chain stores the plurality of optical fiber cables by bundling a plurality of combination cables, one of which bundles two or more optical fiber cables. The main frame side cable storage unit may includes a storage chain side fixing part for fixing the end of the cable storage chain on the main frame side, a combination cable fixing part for fixing the combination cable extending from the cable storage chain at the end from which the combination cable is divided into two or more optical fiber cables and a main frame side fixing part for fixing the non-stored portion of the plurality of optical fiber cables on the main frame side at the boundary between a portion stored into the main frame side cable storage unit and a portion extending to the outside of the main frame side cable storage unit.

The main frame side cable storage unit may include an inner-storage unit fixing part for bending a portion stored into the main frame side cable storage unit of the non-stored portion of the optical fiber cables on the main frame side such that the bending radius of the portion stored into the main frame side cable storage unit is larger than the allowance bending radius of the optical fiber cables and fixing the same.

The minimum bending radius of the cable storage chain may be larger than the allowable bending radius of the optical fiber cables.

The length of the non-stored portion on the test head side extending from the test head side cable storage unit to the test head for each of the plurality of optical fiber cables may be determined based on a position of the test head side fixing part for fixing the optical fiber cables and a position of a connector for connecting the optical fiber cables to the test head. Meanwhile, the length of the non-stored portion on the main frame side extending from the main frame side cable storage unit to the main frame may be determined based on a position of the main frame side fixing part for fixing the optical fiber cables and a position of a connector for connecting the optical fiber cables to the main frame.

According to a second embodiment of the present invention, an optical coupler, in a test apparatus for testing a device under test, for optically coupling a test head for applying a test pattern to the device under test and a main frame for controlling test sequences of the test head is provided. The optical coupler has: a plurality of optical fiber cables for optically coupling the main frame and the test head; a cable storage chain for bundling stored portions except for a non-stored portion of the plurality of optical fiber cables on the test head side and a non-stored portion of the plurality of optical fiber cables on the main frame side to store therein the same; a test head side cable storage unit provided at the boundary between the non-stored portion and the stored portion of the plurality of optical fiber cables on the test head side and being capable of adjusting a length for storing therein the non-stored portion of the plurality of optical fiber cables on the test head side; and a main frame side cable storage unit provided at the boundary between the non-stored portion and the stored portion of the plurality of optical fiber cables on the main frame side and being capable of adjusting a length for storing therein the non-stored portion of the plurality of optical fiber cables on the main frame side.

According to a third embodiment of the present invention, a method of manufacturing an optical coupler, in a test apparatus for testing a device under test, for optically coupling a test head for applying a test pattern to the device under test and a main frame for controlling test sequences of the test head is provided. The method of manufacturing an optical coupler includes: a cable storing step of bundling stored portions except for a non-stored portion on the test head side and a non-stored portion on the main frame side of a plurality of optical fiber cables for coupling the main frame and the test head and storing the same; a test head side storing step of providing a test head side cable storage unit being capable of adjusting a length for storing therein the non-stored portion of the plurality of optical fiber cables on the test head side at the boundary between the non-stored portion and the stored portion of the plurality of optical fiber cables on the test head side; and a main frame side storing step of providing a main frame side cable storage unit being capable of adjusting a length for storing therein the non-stored portion of the plurality of optical fiber cables on the main frame side at the boundary between the non-stored portion and the stored portion of the plurality of optical fiber cables on the main frame side.

The main frame side storage step may include a main frame side temporary coupling step of coupling the plurality of optical fiber cables to a main frame fixture which is provided on a location different from the main frame to which the plurality of optical fiber cables are coupled and has a plurality of connectors provided in the arrangement same as the plurality of connectors of the main frame to which the plurality of optical fiber cables are coupled, respectively and a main frame side cable length adjusting step of adjusting a length for storing the non-stored portion of the plurality of optical fiber cables on the main frame side while the plurality of optical fiber cable are coupled to the main frame fixture.

Here, all necessary features of the present invention are not listed in the summary of the invention. The sub-combinations of the features may become the invention.

According to the present invention, optical fiber cables between the main frame and the test head can be appropriately bundled to wire the same.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
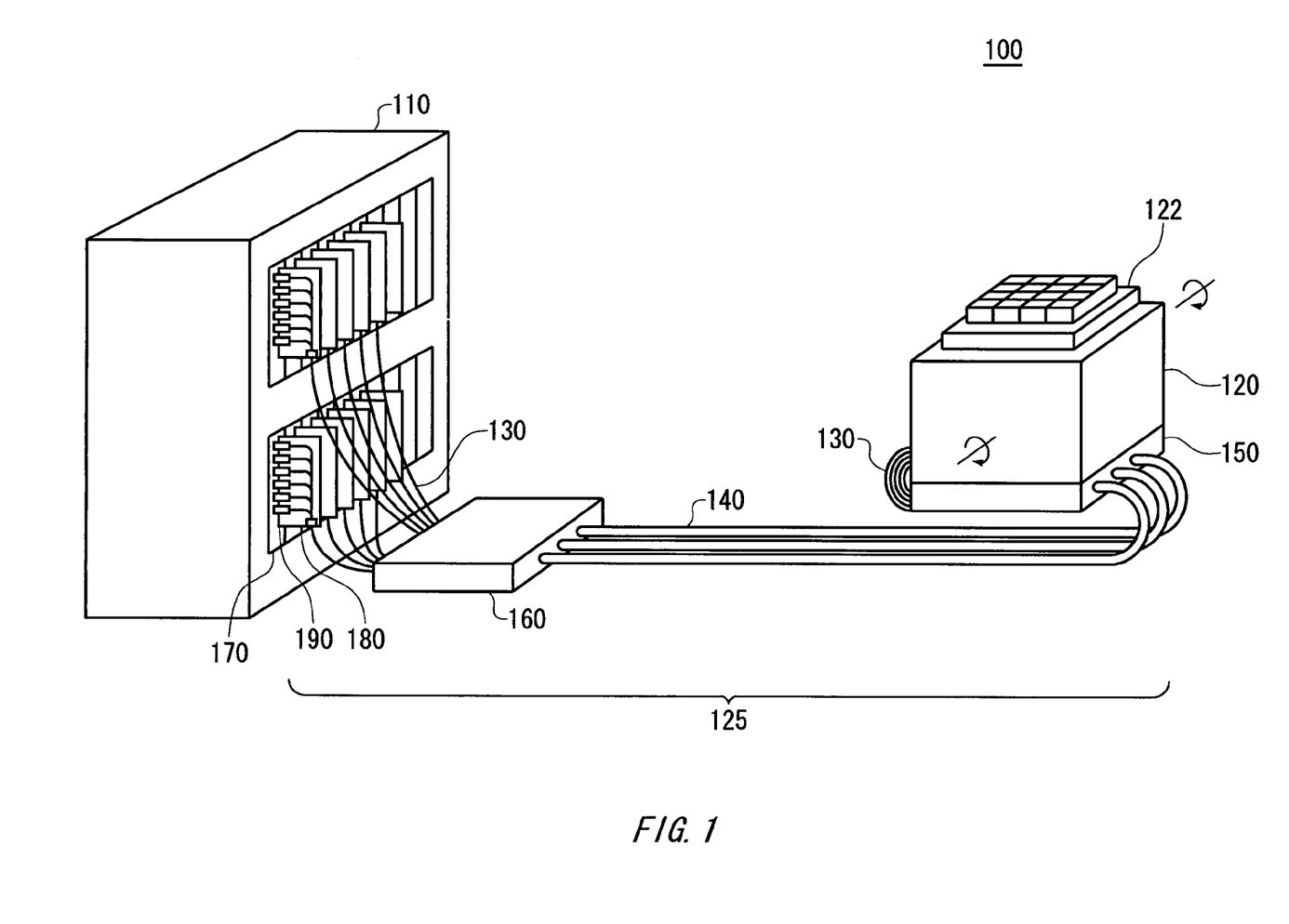
FIG. 1 shows a configuration of a test apparatus 100 according to an embodiment of the present invention.

FIG. 1 shows a configuration of a test apparatus 100 according to the present embodiment. In the test apparatus 100 according to the present embodiment, optical fiber cables for transmitting signals between a main frame 110 and a test head 120 are appropriately bundled and wired. Thereby the optical fiber cables are prevented from exposing to the floor face between the main frame 110 and the test head 120 while the curvature limit of the optical fiber is satisfied. The length of optical fibers exposing near the main frame 110 and the test head 120 can be adjusted. Thereby such optical wiring being easy to break in comparison with an electric wiring can be provided separately from the electric wiring. Then, the optical wiring can be handled more carefully than the electric wiring in assembling the test apparatus 100.

The test apparatus 100 tests a device under test. The test apparatus 100 includes the test head 120 for applying a test pattern to a device under test, the main frame 110 for controlling test sequences of the test head 120 and an optical coupler 125 for optically coupling the main frame 110 and the test head 120. Additionally, the test apparatus 100 may includes an electric coupler for electrically coupling the test head 120 and the main frame 110 besides the optical coupler 125.

The upper surface of the test head 120 includes a performance board 122 for putting a device under test thereon. The main frame 110 has a plurality of test boards 170 and controls test sequences of the device under test based on signals transmitted/received to/from the test head 120 through the optical coupler 125.

The optical coupler 125 has a plurality of optical fiber cables 130, one or more optical fiber cable units 140, a test head side cable storage unit 150, a main frame side cable storage unit 160 and a cable guide unit 180. The plurality of optical fiber cables 130 optically couple the main frame 110 and the test head 120. The optical fiber cable unit 140 has a configuration in which the plurality of optical fiber cables is bundled and stored in a cable storage chain. In the present embodiment, the plurality of optical fiber cables 140 are provided between the test head side cable storage unit 150 and the main frame side cable storage unit 160.

The test head side cable storage unit 150 is provided at the boundary between the non-stored portion and the stored portion of the plurality of optical fiber cables 130 on the test head 120 side and attached to the under surface. The test head side cable storage unit 150 according to the present embodiment stores the optical fiber cables 130 near the boundary and can adjust the length for storing therein the non-stored portion of the plurality of optical fiber cables 130 on the test head 120 side. Thereby the test head side cable storage unit 150 can appropriately adjust the length of the optical fiber cables 130 which extend from the test head side cable storage unit 150 and are coupled to the test head 120.

The main frame side cable storage unit 160 is provided at the boundary between the non-stored portion and the stored portion of the plurality of optical fiber cables 130 on the main frame 110 side and stores the optical fiber cables 130 near the boundary. The main frame side cable storage unit 160 according to the present embodiment can adjust the length for storing therein the non-stored portion of the plurality of optical fiber cables 130 on the main frame 110 side. Thereby the main frame side cable storage unit 160 can appropriately adjust the length of the optical fiber cables 130 which extends from the main frame side cable storage unit 160 and are coupled to the main frame 110.

The cable guide unit 180 attaches/detaches collectively two or more optical fiber cables 130 to/from a test board 170. Connectors 190 positioned at the end of the optical fiber cables 130 are arranged on the edge along which the cable guide unit 180 is connected to the test board 170.

According to the above-described optical coupler 125, the plurality of optical fiber cables 130 are stored in the cable storage chain to wire the same between the test head side cable storage unit 150 and the main frame side cable storage unit 160 so that the optical fiber cables 130 can be protected and also can be prevented from scattering. Additionally, the main frame side cable storage unit 160 is disposed near the main frame 110, and the test head side cable storage unit 150 is disposed on the bottom surface of the test head 120. Thereby the length of the optical fiber cables 130 exposed between the main frame 110 and the main frame side cable storage unit 160, and between the test head 120 and the test head side cable storage unit 150 can be appropriately adjusted.

Figure 2A:
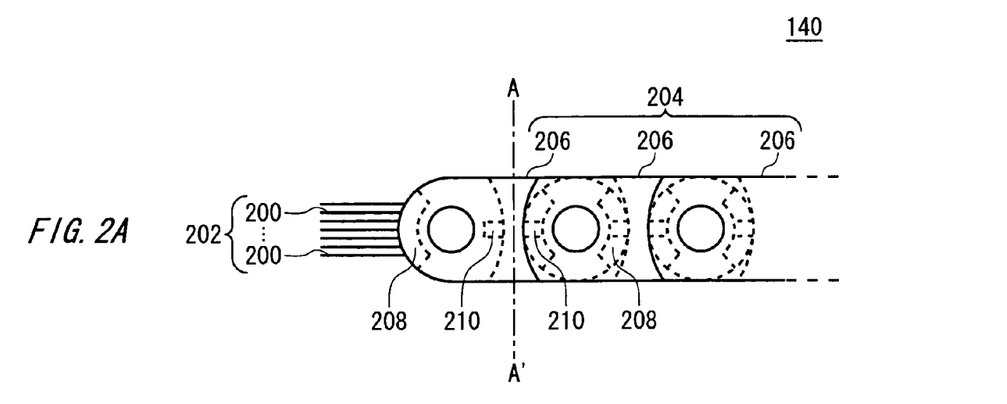
FIG. 2A, FIG. 2B and FIG. 2C show a configuration of an optical fiber cable unit 140 according to an embodiment of the present invention, respectively.
Figure 2B:
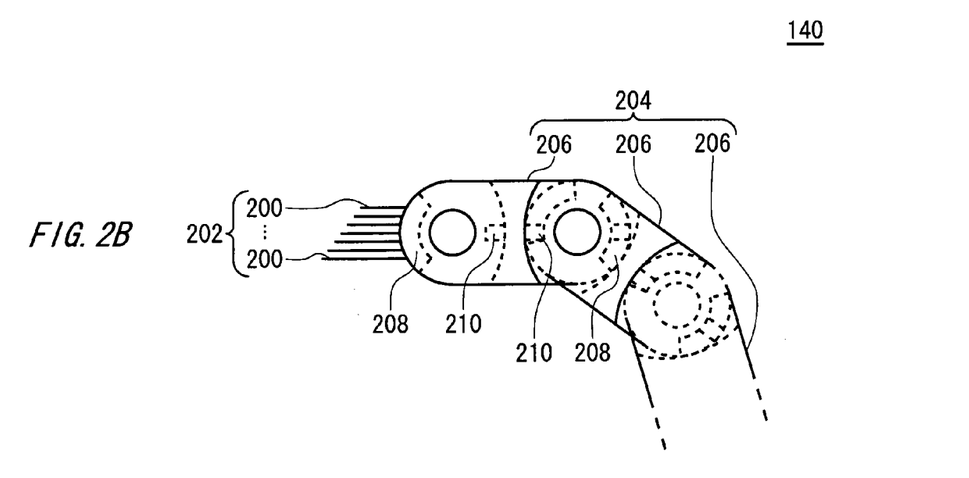
Figure 2C:
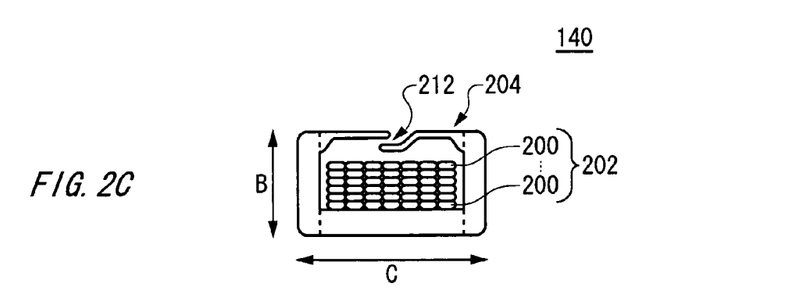

FIGS. 2A and 2B show a configuration of the optical fiber cable unit 140 according to the present embodiment. FIGS. 2A and 2B are side views of the optical fiber cable unit 140. FIG. 2C is a sectional view of the optical fiber cable unit 140, taken along line AA'. Here, FIG. 2A shows that the optical fiber cable unit 140 is not bent. FIG. 2B shows that the optical fiber cable unit 140 is bent.

The optical fiber cable unit 140 includes a combination cable group 202 in which a plurality of combination cables 200 are stacked in a stacking direction B and a cable storage chain 204 which holds slidably the plurality of stacked combination cable groups 202 each other and can be bent in the stacking direction. Each of the plurality of combination cable groups 202 are formed into one inseparable cable by bundling two or more optical fiber cables 130. The cable storage chain 204 stores a plurality of optical fiber cables 130 including a plurality of bundles of the combination cable 200. The cable storage chain 204 is provided in order to protect cables by covering around the cables transmitting electrical signals or optical signals and prevent the cables from damaging.

Specifically, the cable storage chain 204 bundles the plurality of optical fiber cables 130 between the test head side cable storage unit 150 and the main frame side cable storage unit 160 and stores therein the same. That is to say, the cable storage chain 204 bundles the stored portions between the test head side cable storage unit 150 and the main frame side cable storage unit 160 except for the non-stored portion of the plurality of optical fiber cables 130 in a part of the test head 120 side and a non-stored portion of the plurality of optical fiber cables 130 in a part of the main frame 110 side and stores therein the same.

As shown in FIG. 2A and FIG. 2B, the cable storage chain 204 has a configuration in which a plurality of pieces 206 are rotatably connected each other. The plurality of pieces 206 have gloves 208 and pawls 210 provided from side to side, respectively. The groove 208 of one of the pieces 206 and the pawl 210 of another piece adjacent to the one of the pieces 206 are fitted each other. Then, the movement of the pawl 210 of the one piece 206 is limited within the groove 208 of another piece 206 so that the bending angle between adjacent pieces 206 is limited. Thereby the minimum bending radius of the cable storage chain 204 is limited. It is preferable that the minimum bending radius of the cable storage chain 204 is larger than the allowable bending radius of the plurality of combination cables 200 stored in the cable storage chain 204. Thereby the bending radius of the plurality of combination cables 200 can be maintained at larger than the allowable bending radius of the same. The allowable bending radius of the combination cable 200 is 50 mm, for example.

As shown in FIG. 2C, a combination cable 200 is a flat cable in which two or more optical fiber cables 130 including a plurality of optical fiber core wires aligned in the arranging direction C in one example, where, a plurality of combination cables 200 are connected and disposed in the arranging direction C. The cable storage chain 204 has a back slit 212 which slits in the longitudinal direction along the cable storage chain 204 on the side surface of the cable storage chain 204 in a stacking direction B. Thereby the cable storage chain 204 can respond flexibly to any twist of the optical fiber cable unit 140.

Here, it is preferable that the combination cables 200 are stacked to store in the cable storage chain 204 while a space in which the combination cables 200 are not stacked is left in the stacking direction B in the cable storage chain 204. For example, it is preferable that the cable storage chain 204 stacks and stores the combination cables 200 therein less than 60% of its space in the stacking direction B. Thus the cable storage chain 204 stores the combination cables 200 therein with a blank space in the stacking direction B. Therefore, the combination cables 200 can be freely slid and the effect due to twisting of the combination cables can be reduced when the cable storage chain 204 is twisted.

Additionally, the optical fiber cable unit 140 may further have a sliding sheets for sliding the combination cable 200 for each layer to slidably store therein the same each between the plurality of stacked combination cables 200.

Figure 3:
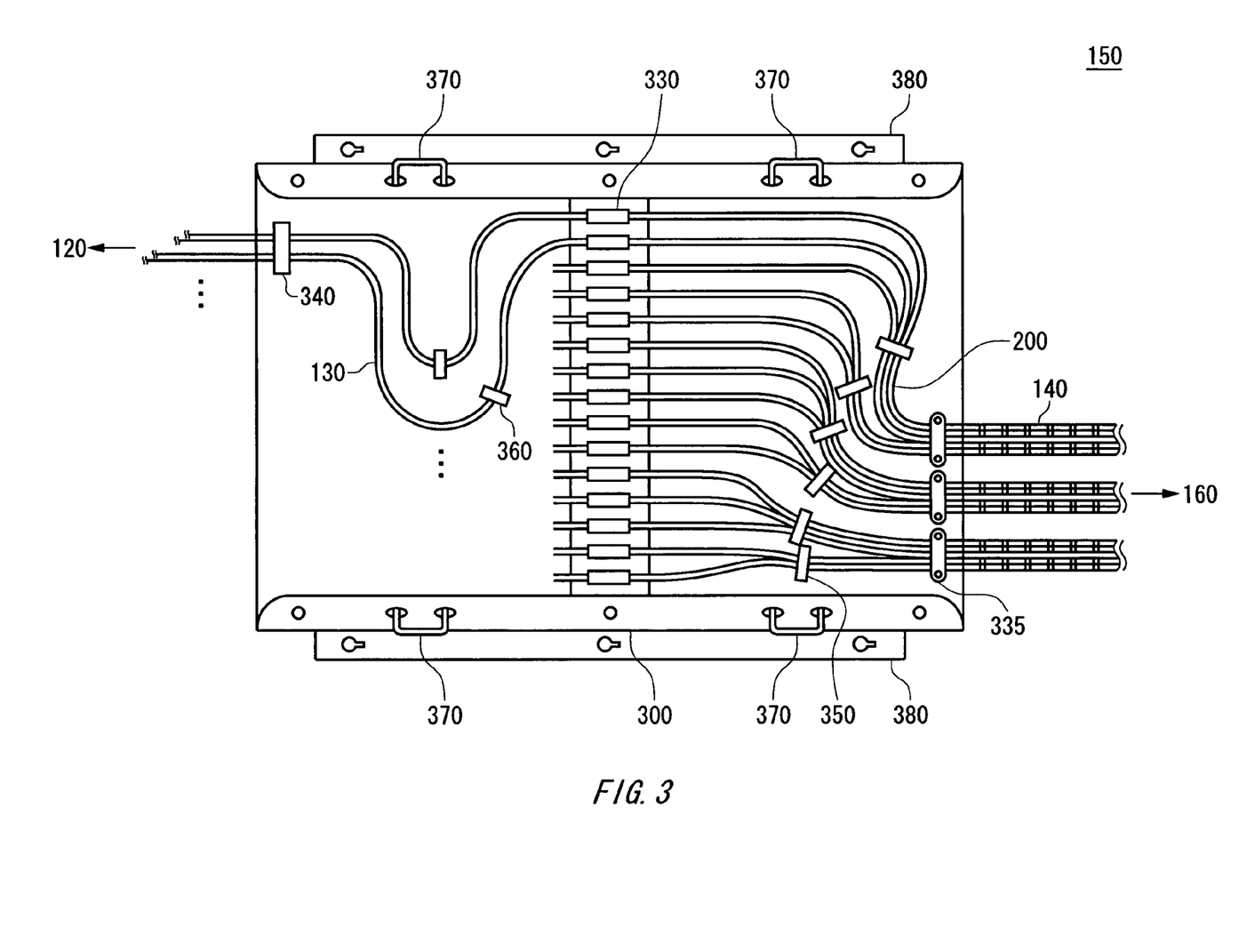
FIG. 3 shows a configuration of a test head side cable storage unit 150 according to an embodiment of the present invention.

FIG. 3 shows a configuration of a test head side cable storage unit 150 according to the present invention. The test head side cable storage unit 150 has a case 300, a storage cable fixing part 335, a test head side fixing part 340, a combination cable fixing part 330, one or more inner-storage unit fixing part 350 and 360, one or more handles 370 and a case cover (not shown).

The case 300 stores therein the non-stored portion of the plurality of optical fiber cables 130 which is not stored in the cable storage chain 204 on test head 120. The storage cable fixing part 335 fixes the end of the cable storage chain 204 on the test head 120 side at the boundary location between the inside and the outside of the test head side cable storage unit 150 in the case 300. The storage cable fixing part 335 according to the present embodiment fixes the plurality of optical fiber cable units 140 to the case 300 such that the distance to the adjacent optical fiber cable unit 140 is smaller than the width of the optical fiber cable unit 140. Thereby the plurality of optical fiber cables 140 are adjacent each other so that the optical fiber cable units 140 are easily passed between the test head side cable storage unit 150 and the main frame side cable storage unit 160.

The test head side fixing part 340 fixes the non-stored portion of the plurality of optical fiber cables 130 on the test head 120 side to the case 300 at the boundary between a portion stored into the test head side cable storage unit 150 and a portion extending to the outside of the test head side cable storage unit 150. The combination cable fixing part 330 fixes the combination cable 200 extending from the cable storage chain 204 to the case 300 at the end from which the combination cable 200 is divided into two or more optical fiber cables 130.

The one or more inner storage unit fixing part 350 bends the portion stored into the test head side cable storage unit 150 among the portion not stored in the cable storage chain 204 of the combination cables 200 on the test head 120 side such that the bending radius of the portion stored into the test head side cable storage unit 150 is larger than the allowable bending radius of the combination cable 200 and fixes the same. Thereby the movement of the combination cable 200 in the longitudinal direction can be absorbed when the curvature of the optical fiber cable unit 140 is changed so that the combination cable 200 is slid in the cable storage chain 204.

The one or more inner storage unit fixing part 360 bends the portion stored into the test head side cable storage unit 150 of the not stored portion of the optical fiber cables 130 on the test head 120 side bends such that the bending radius of the portion stored into the test head side cable storage unit 150 is larger than the allowable bending radius of the optical fiber cables 130 and fixes the same. Thereby the test head side cable storage unit 150 can fix each of the plurality of optical fiber cables 130 to the case 300 while the length of the non-stored portion on the test head 120 side for extending from the test head side cable storage unit 150 to the test head 120 is adjusted. Additionally, even if the connector of the end of the test head 120 side in the optical fiber cable 130 is broken down, the optical fiber cable is cut and a new connector is refixed so that the non-stored portion 130 stored into the test head side cable storage unit 150 can be drawn by a length compensating for the cut length.

The handles 370 are used to lift the case 300 and set it to the upper side of the test head 120 while the test head 120 is turned to place the performance board on the bottom side. The case fixing part 380 has a mounting groove for mounting the case 300 to the test head 120. The case 300 is slid to the test head 120 after installing a protrusion provided in the test head 120 into the mounting grooves and fixed to the test head 120. Then, a case cover is covered on top of the case 300 fixed to the test head 120. Then, the test head 120 is turned again so that the performance board is returned to the upper side. Therefore, the test head side cable storage unit 150 is positioned below the test head 120 at testing the device under test.

The configuration of the main frame side cable storage unit 160 is approximately same as the test head side cable storage unit 150, so that hereinafter the description is omitted except for differences. The storage cable fixing part 335 of the main frame side cable fixing part 160 fixes the end of the cable storage chain 204 on the main frame side.

The main frame side fixing part corresponding to the test head side fixing part 340 fixes the portion not stored in the cable storage chain 204 of the plurality of optical fiber cables 130 on the main frame 110 side at the boundary between the portion stored into the main frame side cable storage unit 160 and the portion extending to the outside of the main frame side cable storage unit 160. Here, the main frame side cable storage unit 160 may not have the combination cable fixing part 330, alternatively, may have the same. If the main frame side cable storage unit 160 has the combination cable fixing part 330, the combination cable fixing part 330 fixes the combination cable 200 extending from the cable storage chain 204 at the end from which the combination cable 200 is divided into two or more optical fiber cables 130.

The one or more inner storage unit fixing part 350 bends the portion stored into the main frame side cable storage unit 160 among the non-stored portion of the combination cables 200 on the main frame 110 side such that the bending radius of the portion stored into the main frame side cable storage unit 160 is larger than the allowable bending radius of the combination cable 200 and fixes the same. The one or more inner storage unit fixing part 360 bends the portion stored into the main frame side cable storage unit 160 among the not stored portion of the optical fiber cables 130 on the main frame 110 side bends such that the bending radius of the portion stored into the main frame side cable storage unit 160 is larger than the allowable bending radius of the optical fiber cables 130 and fixes the same.

Here, since the main frame side cable storage unit 160 according to the embodiment is installed on the floor face near the main frame 110, the handles 370 and the case fixing part 380 may not be needed.

Figure 4:
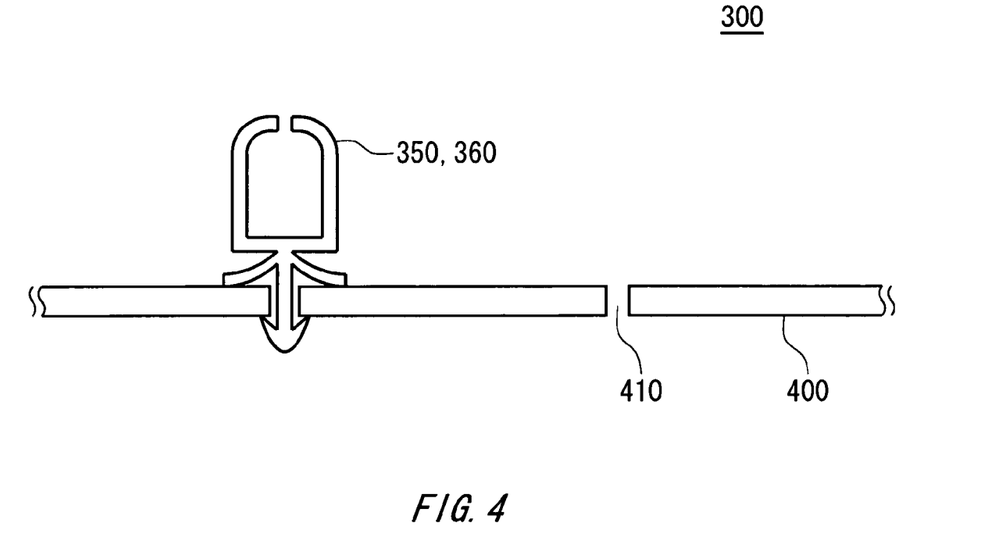
FIG. 4 shows an example of a configuration of a case 300, an inner-storage unit fixing part 350 and an inner-storage unit fixing part 360 according to an embodiment of the present invention.

FIG. 4 shows an example of a configuration of a case 300, an inner-storage unit fixing part 350 and an inner-storage unit fixing part 360. A bottom plate 400 of the case 300 has a plurality of holes 410. The inner-storage unit fixing part 350 bundles and fixes the combination cables 200 and the inner-storage unit fixing part 360 bundles and fixes the optical fiber cables 130. The inner-storage unit fixing part 350 and 360 run the combination cables 200 and the optical fiber cables 130 through the ring with the back slit so that the combination cables 200 and the optical fiber cables 130 are bundled, for example.

Additionally, the inner-storage unit fixing part 350 and 360 have a fixing end which is inserted into the hole 410 to fix the inner-storage unit fixing part 350 and 360 to the bottom plate 400. The fixing end is inserted into the hole 410 and a hook formed near the front edge of the fixing end widens larger then the diameter of the hole 410 so that the fixing end is fixed so as not to detach from the hole 410, for example. Thereby the inner-storage unit fixing part 350 and 360 are fixed to the bottom plate 400 so that the combination cables 200 and the optical fiber cables 130 are prevented from moving to the plane direction of the bottom plate. Additionally, the inner-storage unit fixing part 350 and 360 may be detached from the hole 410. In this case, the inner-storage unit fixing part 350 and 360 include a structure and a material allows the inner-storage unit fixing part 350 and 360 to be detached by holding down the hook widened more than the diameter of the hole 410 and reducing its width to less than the diameter of the hole 410.

Thus, the bottom plate 400 may have a structure in which a plurality of holes 410 are arranged at even intervals such as 5 cm in a lattice pattern. Thereby the inner-storage unit fixing part 350 and 360 are inserted into the proper holes 410 and the combination cables 200 and the optical fiber cables 130 are fixed through the inner-storage unit fixing part 350 and 360. Therefore, the combination cables 200 and the optical fiber cables 130 can be fixed to the bottom plate 400 such that the condition of the minimum bending radius of the combination cables 200 and the optical fiber cables 130 can be satisfied.

Figure 5:
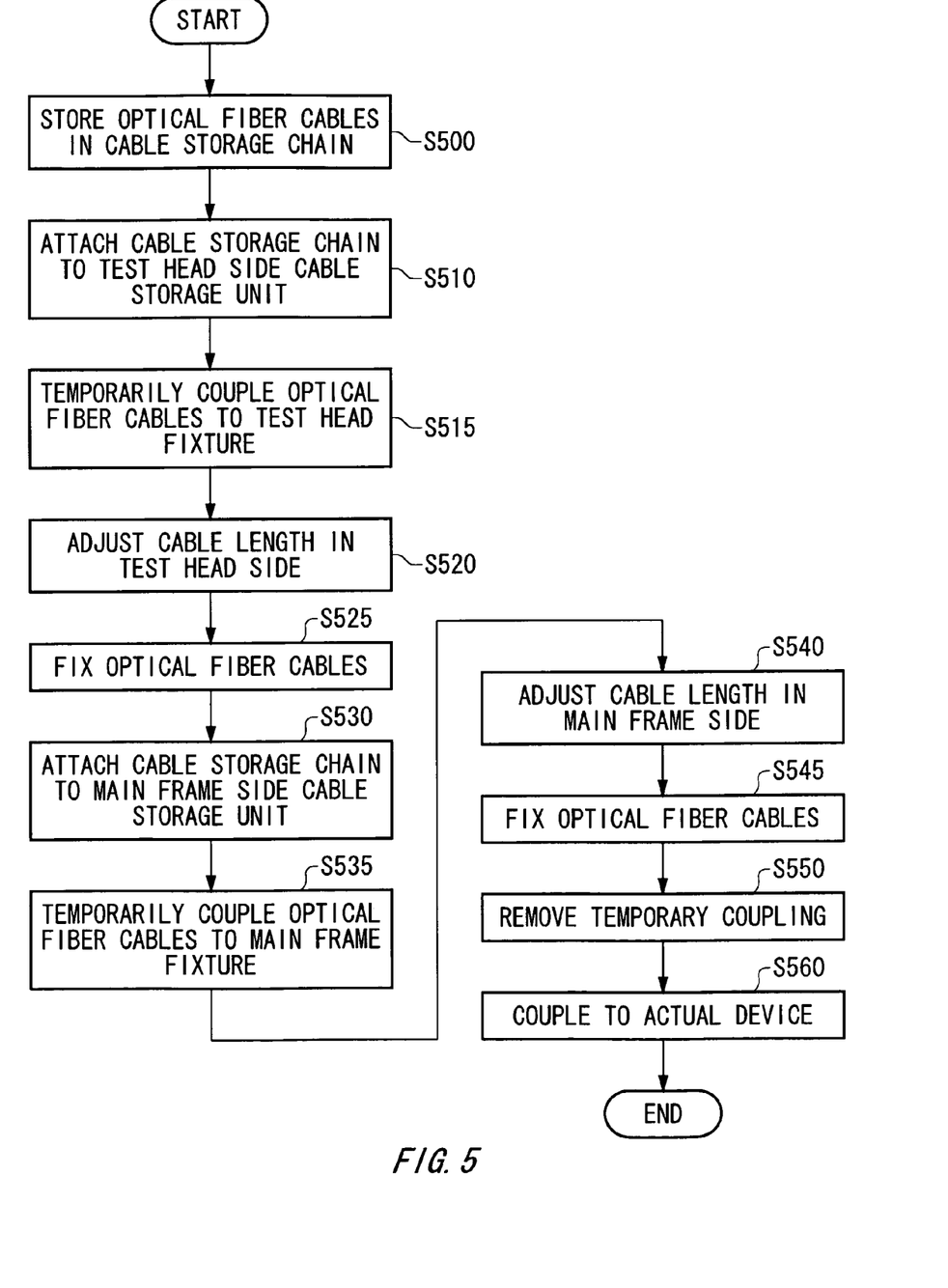
FIG. 5 shows a method of manufacturing an optical coupler 125 according to an embodiment of the present invention.

FIG. 5 shows a method of manufacturing an optical coupler 125 according to the embodiment. The method of manufacturing an optical coupler 125 constitutes a part of the manufacturing process of the test apparatus 100.

Firstly, in cable storage step S500, stored portions except for a non-stored portion of optical fiber cables 130 on the test head 120 and a non-stored portion of the optical fiber cables 130 on the main frame side 110 are bundled to store in the cable storage chain 204.

Next, from test head side storing step S510 to S525, the test head side cable storage unit 150 of which length for storing therein the non-stored portion of the plurality of optical fiber cables 130 on the test head 120 side at the boundary between the non-stored portion and the stored portion of the plurality of optical fiber cables 130 on the test head 120 side.

Specifically, in test head side storage cable attaching step S510, the end of the cable storage chain 204 on the test head 120 side is fixed to the test head side cable storage unit 150 by the storage cable fixing part 335. Then, the combination cable 200 extending from the cable storage chain 204 is fixed to the test head side cable storage unit 150 by the combination cable fixing part 330 at the end from which the combination cable 200 is divided into two or more optical fiber cables 130. Then, the portion stored into the test head side cable storage unit 150 of the portion not stored in the cable storage chain 204 of the combination cables 200 on the test head 120 side is bent such that the bending radius of the portion stored into the test head side cable storage unit 150 is larger than the allowance bending radius of the combination cable 200 and fixed by the inner-storage unit fixing part 350.

Next, in test head side temporary coupling step S515, the plurality of optical fiber cables 130 are temporarily coupled to the test head fixture. Here, the test head fixture is provided on a location different from the location of an actual test head 120 to which the plurality of optical fiber cables 130 are finally coupled, that is, such as a manufacturing facility of the optical coupler 125 and has a plurality of connecters provided in the arrangement same as the plurality of connecters in the actual test head 120 to which the plurality of optical fiber cables 130 are finally coupled, respectively.

Next, in test head side cable length adjusting step S520, the length for storing the non-stored portion of the plurality of optical fiber cables 130 on the test head 120 side in the test head side cable storage unit 150 is adjusted while the plurality of optical fiber cables 130 are coupled to the test head fixture. In other words, the length of the non-stored portion for each of the plurality of optical fiber cables 130 on the test head 120 side which extend from the test head side cable storage unit 150 to the test head 120 are determined based on the position of the test head side fixing part 340 for fixing the optical fiber cable 130 and the connector for coupling the optical fiber cable 130 to the test head 120.

Next, in test head side optical fiber cable fixing step S525, the non-stored portion of the plurality of optical fiber cables 130 on the test head 120 side is fixed to the case 300 at the boundary between the portion stored into the test head side cable storage part 150 and the portion extending to the outside of the test head side cable storage unit 150 using the test head side fixing part 340. Additionally, the portion stored into the test head side cable storage unit 150 of the portion not stored in the cable storage chain 204 of the plurality of optical fiber cables 130 on the test head 120 side is bent such that the bending radius of the portion stored into the test head side cable storage unit 150 is larger than the allowance bending radius of the optical fiber cable 130 and fixed by the inner-storage unit fixing part 360.

Next, from main frame side storing step S530 to S545, the main frame side cable storage unit 160 of which length for storing therein the non-stored portion of the plurality of optical fiber cables 130 on the main frame 110 side at the boundary between the non-stored portion and the stored portion of the plurality of optical fiber cables 130 on the main frame 110 side.

Specifically, in main frame side storage cable attaching step S530, the end of the cable storage chain 204 on the main frame 110 side is fixed to the main frame side cable storage unit 160 by the storage cable fixing part 335. Then, the combination cable 200 extending from the cable storage chain 204 is fixed to the main frame side cable storage unit 150 by the combination cable fixing part 330 at the end from which the combination cable 200 is divided into two or more optical fiber cables 130. Then, the portion stored into the main frame side cable storage unit 160 of the portion not stored in the cable storage chain 204 of the combination cables 200 on the main frame 110 side is bent such that the bending radius of the portion stored into the main frame side cable storage unit 160 is larger than the allowance bending radius of the combination cable 200 and fixed by the inner-storage unit fixing part 350.

Next, in main frame side temporary coupling step 535, the plurality of optical fiber cables 130 are temporarily coupled to the main frame fixture. Here, the main frame fixture is provided on a location different from the location of an actual main frame 110 to which the plurality of optical fiber cables 130 are finally coupled, that is, such as a manufacturing facility of the optical coupler 125 and has a plurality of connecters provided in the arrangement same as the plurality of connecters in the actual main frame 110 to which the plurality of optical fiber cables 130 are finally coupled, respectively.

Next, in main frame side cable length adjusting step S540, the length for storing the non-stored portion of the plurality of optical fiber cables 130 on the main frame 120 side in the main frame side cable storage unit 160 is adjusted while the plurality of optical fiber cables 130 are coupled to the main frame fixture. In other words, the length of the non-stored portion for each of the plurality of optical fiber cables 130 on the main frame 110 side which extend from the main frame side cable storage unit 160 to the main frame 110 are determined based on the position of the test head side fixing part 340 for fixing the optical fiber cable 130 and the connector 190 for coupling the optical fiber cable 130 to the main frame 110.

Next, in main frame side optical fiber cable fixing step S545, the non-stored portion of the plurality of optical fiber cables 130 on the main frame 110 side is fixed to the case 300 at the boundary between the portion stored into the main frame side cable storage part 160 and the portion extending to the outside of the main frame side cable storage unit 160 using the main frame side fixing part. Additionally, the portion stored into the main frame side cable storage unit 160 of the portion not stored in the cable storage chain 204 of the plurality of optical fiber cables 130 on the test head 120 side is bent such that the bending radius of the portion stored into the main frame side cable storage unit 160 is larger than the allowance bending radius of the optical fiber cable 130 and fixed by the inner-storage unit fixing part 360.

Next, in temporary coupling removing step 550, the plurality of optical fiber cables 130 are removed from the main frame fixture and the test head fixture. Then, in actual device coupling step 560, the optical coupler 125 is coupled to the actual main frame 110 and the actual test head 120.

According to the above described method of manufacturing the optical coupler 125, the cable length of the plurality of optical fiber cables 130 extending from the main frame side cable storage unit 160 and the test head side cable storage unit 150 can be previously adjusted using the main frame fixture and the test head fixture. Thereby it is not necessary to adjust the cable length in the place where the test apparatus 100 is delivered so that delivery can be efficiently operated. Here, the cable length may be adjusted using the actual main frame 110 and the actual test head 120 as substitute for using the main frame fixture and the test head fixture.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. A test apparatus for testing a device under test, comprising:
   a test head for applying a test pattern to the device under test; a main frame for controlling test sequences of the test head; and
   a optical coupler for coupling the main frame and the test head,
   wherein the optical coupler including:
   a plurality of optical fiber cables for optically coupling the main frame and the test head;
   a cable storage chain for bundling a stored portion except for a non-stored portion in a part of the test head side and a non-stored portion in a part of the main frame side of the plurality of optical fiber cables and storing the same, wherein the cable storage chain is disposed between the test head side cable storage unit and the main frame side cable storage unit, wherein the cable storage chain has a space along the longitudinal direction thereof, wherein the optical fiber cables are stored within the space, and wherein the cable storage chain has a plurality of pieces therein configured to be rotatably connected to each other in the longitudinal direction of the cable storage chain;
   a test head side cable storage unit provided at the boundary between the non-stored portion and the stored portion of the plurality of optical fiber cables on the test head side and being capable of adjusting a length for storing therein the non-stored portion on the test head side; and
   a main frame side cable storage unit provided at the boundary between the non-stored portion and the stored portion of the plurality of optical fiber cables on the main frame side and being capable of adjusting a length for storing therein the non-stored portion on the main frame side.

2. The test apparatus according to claim 1, wherein the device under test is placed on the upper surface of the test head and the test head side cable storage unit is attached to the bottom surface of the test head.

3. The test apparatus according to claim 1, wherein the test head side cable storage unit includes a storage chain side fixing part for fixing the end of the cable storage chain on the test head side.

4. The test apparatus according to claim 1, wherein the test head side cable storage unit includes a test head side fixing part for fixing the non-stored portion of the plurality of optical fiber cables on the test head side at the boundary between the portion stored into the test head side cable storage unit and the portion extending to the outside of the test head side cable storage unit.

5. The test apparatus according to claim 1, wherein the cable storage chain stores the plurality of optical fiber cables by bundling a plurality of combination cables, one of which bundles two or more optical fiber cables and wherein the test head side cable storage unit including: a storage chain side fixing part for fixing the end of the cable storage chain on the test head side; a combination cable fixing part for fixing the combination cable extending from the cable storage chain at the end from which the combination cable is divided into two or more optical fiber cables; and a test head side fixing part for fixing the non-stored portion of the plurality of optical fiber cables on the test head side at the boundary between a portion stored into the test head side cable storage unit and a portion extending to the outside of the test head side cable storage unit.

6. The test apparatus according to claim 1, wherein the test head side cable storage unit includes an inner-storage unit fixing part for bending a portion stored into the test head side cable storage unit of the non-stored portion of the optical fiber cables on the test head side such that the bending radius of the portion stored into the test head side cable storage unit is larger than the allowance bending radius of the optical fiber cables and fixing the same.

7. The test apparatus according to claim 1, wherein the main frame side cable storage unit includes a storage chain side fixing part for fixing the end of the cable storage chain on the main frame side.

8. The test apparatus according to claim 1, wherein the main frame side cable storage unit includes a main frame side fixing part for fixing the non-stored portion of the plurality of optical fiber cables on the main frame side at the boundary between a portion stored into the main frame side cable storage unit and a portion extending to the outside of the main frame side cable storage unit.

9. The test apparatus according to claim 1, wherein the cable storage chain stores the plurality of optical fiber cables by bundling a plurality of combination cables, one of which bundles two or more optical fiber cables and wherein the main frame side cable storage unit including: a storage chain side fixing part for fixing the end of the cable storage chain on the main frame side; a combination cable fixing part for fixing the combination cable extending from the cable storage chain at the end from which the combination cable is divided into two or more optical fiber cables; and a main frame side fixing part for fixing the non-stored portion of the plurality of optical fiber cables on the main frame side at the boundary between a portion stored into the main frame side cable storage unit and a portion extending to the outside of the main frame side cable storage unit.

10. The test apparatus according to claim 1, wherein the main frame side cable storage unit includes an inner-storage unit fixing part for bending a portion stored into the main frame side cable storage unit of the non-stored portion of the optical fiber cables on the main frame side such that the bending radius of the portion stored into the main frame side cable storage unit is larger than the allowance bending radius of the optical fiber cables and fixing the same.

11. The test apparatus according to claim 1, wherein the minimum bending radius of the cable storage chain is larger than the allowance bending radius of the optical fiber cables.

12. The test apparatus according to claim 1, wherein the length of the non-stored portion on the test head side extending from the test head side cable storage unit to the test head for each of the plurality of optical fiber cables is determined based on a position of the test head side fixing part for fixing the optical fiber cables and a position of a connector for connecting the optical fiber cables to the test head, and the length of the non-stored portion on the main frame side extending from the main frame side cable storage unit to the main frame is determined based on a position of the main frame side fixing part for fixing the optical fiber cables and a position of a connector for connecting the optical fiber cables to the main frame.

13. An optical coupler, in a test apparatus for testing a device under test, for optically coupling a test bead to apply a test pattern to the device under test and a main frame to control test sequences of the test head, comprising:
 a plurality of optical fiber cables for optically coupling the main frame and the test head;
 a cable storage chain for bundling a stored portion except for a non-stored portion in a part of the test head side and a non-stored portion in a part of the main frame side of the plurality of optical fiber cables and storing the same, wherein the cable storage chain is disposed between the test head side cable storage unit and the main frame side cable storage unit, wherein the cable storage chain has a space along the longitudinal direction thereof, wherein the optical fiber cables are stored within the space, and wherein the cable storage chain has a plurality of pieces therein configured to be rotatably connected to each other in the longitudinal direction of the cable storage chain;
 a test head side cable storage unit provided at the boundary between the non-stored portion and the stored portion of the plurality of optical fiber cables on the test head side and being capable of adjusting a length for storing therein the non-stored portion on the test head side; and
 a main frame side cable storage unit provided at the boundary between the non-stored portion and the stored portion of the plurality of optical fiber cables on the main frame side and being capable of adjusting a length for storing therein the non-stored portion on the main frame side.

14. A method of manufacturing an optical coupler, in a test apparatus for testing a device under test, for optically coupling a test head to apply a test pattern to the device under test and a main frame to control test sequences of the test head, comprising:
 a cable storing step of bundling a stored portion except for a non-stored portion on a part of the test head side and a non-stored portion on a part of the main frame side of a plurality of optical fiber cables for coupling the main frame and the test head and storing the same in a cable storage chain disposed between the test head side cable storage unit and the main frame side cable storage unit, wherein the cable storage chain has a space along the longitudinal direction thereof, wherein the optical fiber cables are stored within the space, and wherein the cable storage chain has a plurality of pieces therein configured to be rotatably connected to each other in the longitudinal direction of the cable storage chain;
 a test head side storing step of providing a test head side cable storage unit being capable of adjusting a length for storing therein the non-stored portion of the plurality of optical fiber cables on the test head side at the boundary between the non-stored portion and the stored portion of the plurality of optical fiber cables on the test head side; and
 a main frame side storing step of providing a main frame side cable storage unit being capable of adjusting a length for storing therein the non-stored portion of the plurality of optical fiber cables on the main frame side at the boundary between the non-stored portion and the stored portion of the plurality of optical fiber cables on the main frame side.

15. The method of manufacturing an optical coupler according to claim 14, wherein the main frame side storage step including:
 a main frame side temporary coupling step of coupling the plurality of optical fiber cables to a main frame fixture which is provided on a location different from the main frame to which the plurality of optical fiber cables are coupled and has a plurality of connectors provided in the arrangement same as the plurality of connectors of the main frame to which the plurality of optical fiber cables are coupled, respectively; and
 a main frame side cable length adjusting step of adjusting a length for storing the non-stored portion of the plurality of optical fiber cables on the main frame side while the plurality of optical fiber cables are coupled to the main frame fixture.

* * * * *

UNITED STATES PATENT AND TRADEMARK OFFICE
CERTIFICATE OF CORRECTION

| | |
|---|---|
| PATENT NO. | : 7,336,885 B2 |
| APPLICATION NO. | : 11/217125 |
| DATED | : February 26, 2008 |
| INVENTOR(S) | : Atsushi Ono et al. |

It is certified that error appears in the above-identified patent and that said Letters Patent is hereby corrected as shown below:

In the Claims:

In Claim 13, column 13, line 41, the word "bead" should be --head--.

Signed and Sealed this

Fifteenth Day of July, 2008

JON W. DUDAS
*Director of the United States Patent and Trademark Office*